Figure 1:
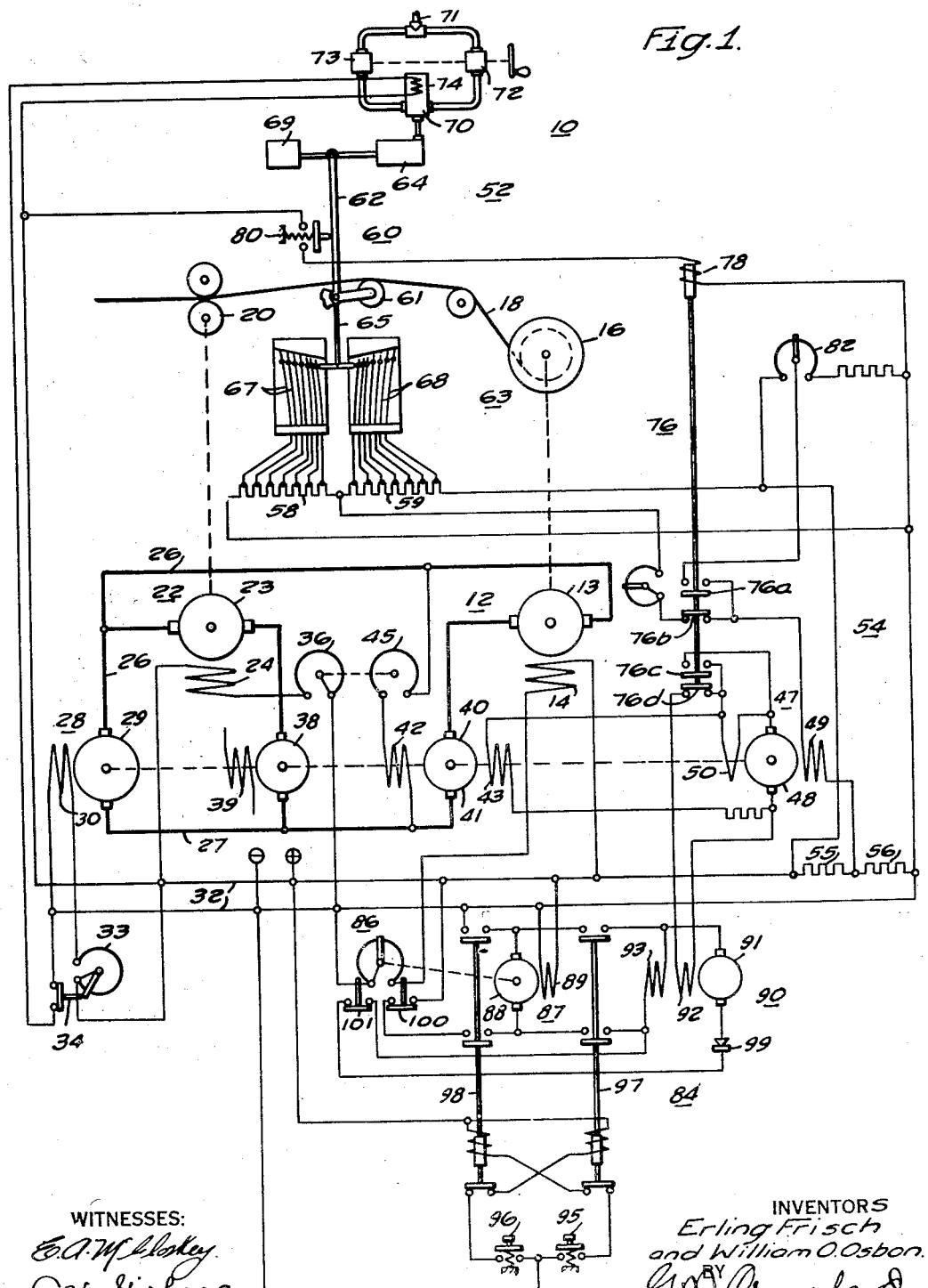

May 16, 1950     E. FRISCH ET AL     2,508,153
TENSION CONTROL SYSTEM
Filed July 17, 1947     2 Sheets—Sheet 1

WITNESSES:
E.A. McCloskey
F.V. Giolma

INVENTORS
Erling Frisch
and William O. Osbon.
BY G.B. Crawford
ATTORNEY

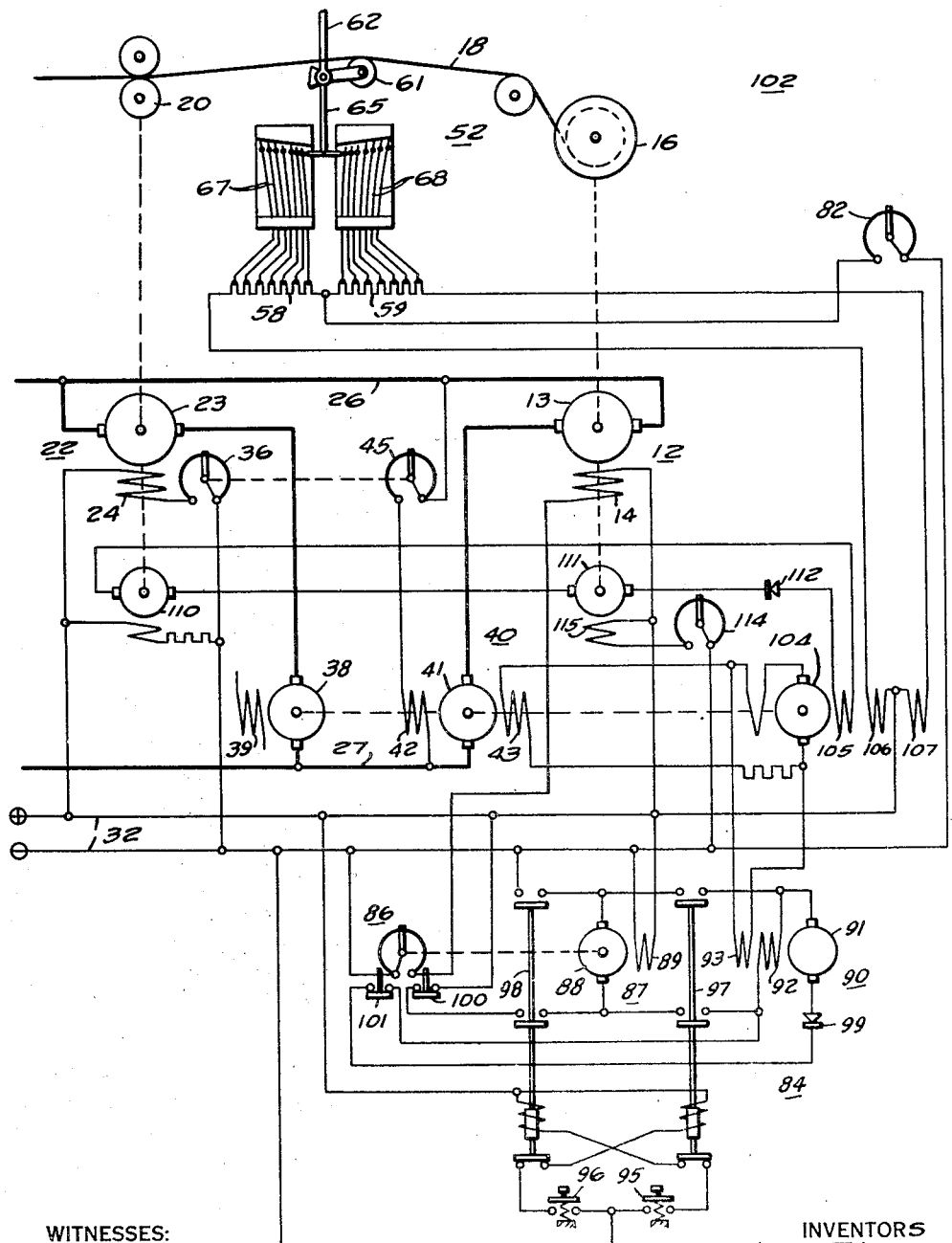

Patented May 16, 1950

2,508,153

UNITED STATES PATENT OFFICE 2,508,153

TENSION CONTROL SYSTEM

Erling Frisch and William O. Osbon, Pittsburgh, Pa., assignors to Westinghouse Electric Corporation, East Pittsburgh, Pa., a corporation of Pennsylvania Application July 17, 1947, Serial No. 761,706

14 Claims. (Cl. 242—75)

Our invention relates, generally, to tension control systems, and it has reference, in particular, to control systems for regulating or controlling the operation of reel motors and the like, such as are commonly used with strip rolling mills of various types to maintain strip tension.

Generally stated, it is an object of our invention to provide a tension control system which is simple and inexpensive to manufacture, and which is reliable and effective in operation.

More specifically, it is an object of our invention to provide for using a tension device for controlling the operation of a reel motor in a winding or unwinding reel system.

It is an important object of our invention to provide in a tension control system for using a regulating generator controlled by a tension device responsive to the position of the strip for controlling the operation of a reel motor to regulate the tension of the strip.

Another object of our invention is to provide, in a system of the character described, for using, in conjunction with the tension device, a regulating generator of the self-energizing type for normally controlling the operation of a reel motor to maintain a predetermined strip tension, and for changing the operating characteristics of the regulating generator so as to convert it to a generator of the ordinary type should the tension device operate to a predetermined minimum value position.

Yet another object of our invention is to provide for compensating for a change in coil diameter during a reeling operation, by utilizing a regulating generator for controlling the operation of a reel motor, and for using the output of the regulating generator for changing the field strength of the reel motor in accordance with the change in the coil diameter.

A further object of our invention is to provide, in a tension control system of the character described, for maintaining the tension of a strip of material independently of the coil diameter.

In it also an important object of our invention to provide for maintaining a predetermined value of strip tension during a winding operation, and for maintaining a lower value of strip tension when the mill is stopped before the completion of a winding operation.

Other objects will, in part, be obvious, and will, in part, be described hereinafter.

In practicing our invention in one of its forms, a tension device is used to apply a lateral force to a strip of material for maintaining a substantially constant tension therein between a roll stand and a winding reel. The armature of the reel motor is energized from a common mill bus, and a booster generator is utilized to vary the voltage applied to the armature. The output voltage of the booster generator is controlled by a regulating generator having a control field winding connected in a bridge circuit, the balance of which is controlled by the tension device, in response to deviations from a normal operating position of the strip of material at the tension device. The energization of the motor field winding is controlled by a rheostat driven by a motor energized in accordance with the output voltage of the regulating generator. Auxiliary contacts on the mill master switch operate a transfer valve to reduce the fluid pressure supplied to the tension device when the mill is shut down before the completion of a winding operation. A limit switch responsive to the maximum deviation position of the tension device changes the regulating generator to a generator of the ordinary type when the strip breaks, or the tension is removed for any other reasons, so that the reel motor will not speed up unduly in an attempt to restore the strip to the predetermined operating position for which the tension device may be adjusted.

For a more complete understanding of the nature and scope of our invention, reference may be made to the following detailed description which may be studied in connection with the accompanying drawings, in which:

Figure 1 is a diagrammatic view of a reel control system embodying our invention in one of its forms; and Fig. 2 is a diagrammatic view of a reel control system embodying our invention in a different form.

Referring to Fig. 1, the reference numeral 10 may denote, generally, a tension control system, wherein a reel motor 12, having an armature 13 and a field winding 14, is connected in driving relation with a reel 16 for winding a strip material 118 which may be delivered thereto by a roll stand 20 of a strip mill, or the like. The roll stand may be representative of the first or last stand of a tandem mill, or the only stand of a single stand mill.

The roll stand 20 may be driven by a roll or mill motor 22 having an armature 23 and a field winding 24. The armature 23 may be supplied with electrical energy from a main mill bus comprising conductors 26 and 27, which may be connected to a main generator 28 having an armature 29 and a field winding 30.

The field winding 30 of the main generator may be energized from a suitable source of electrical energy, being, for example, connected to control bus conductors 32 through a master rheostat 33 having a limit switch 34 associated therewith which returns to the closed position whenever the rheostat is operated to the minimum or "off" position.

The field winding 24 of the mill motor may be energized from the control bus conductors 32 through a field rheostat 36.

A booster generator 38 having a field winding 39, which may be energized from any suitable source of control voltage, may be provided for regulating the voltage applied to the armature 23 of the mill motor.

The armature 13 of the reel motor 12 may also be energized from the main bus conductors 26 and 27, being connected therebetween in circuit relation with a booster generator 40 comprising an armature 41 with main and regulating field windings 42 and 43, respectively. The main field winding 42 may be connected across the main bus conductors 26 and 27 in circuit relation with a field rheostat 45, which may be operatively connected to the rheostat 36 of the mill motor. The regulating field winding 43 may be energized from a regulating generator 47 having an armature 48, a control field winding 49, and a self-energizing field winding 50 of the series type which is disposed to supply the magnetomotive air gap losses of the regulating generator and maintain the output voltage thereof at any value which may exist under balanced operating conditions.

In order to provide for maintaining the tension of the strip 18 at a predetermined value, a tension device, designated generally by the numeral 52, may be provided for subjecting the strip to a transverse deflecting force and for controlling the energization of the control field winding 49 of the regulating generator. As will be described more in detail hereinafter the tension device 52 has a normal operating position or range and the movements thereof are utilized to so control the operation of the reel motor 13 as to pull on the strip and maintain the tension regulating means within its operating range.

In order to effect this result, the control field winding 49 may be connected across a bridge circuit 54 including a pair of fixed resistors 55 and 56, and a pair of variable resistance elements 58 and 59. The bridge circuit may be energized from the control bus conductors 32, and controlled or selectively varied in accordance with the position or movement of the movable portion 60 of the tension regulating means so as to reversably energize the field winding 49 depending on whether the tension of the strip 18 is above or below the desired value.

The movable portion 60 of the tension device 52 may comprise a tension roll 61 for engaging the lower side of the strip 18, being, for example, mounted on a bell crank arm 62 which may be actuated by a fluid pressure device 64. Regulating means 63 may be provided for controlling the resistance of the elements 58 and 59, including a depending arm 65 on the bell crank 62 for progressively actuating one or the other of a plurality of flexible contact members 67 or 68 connected to the elements 58 and 59 to progressively shunt or remove the shunt from one or more steps of the variable resistance elements. The arm 65 and contact members 67 and 68 may be so arranged that when the tension roll 61 is in the proper operating position for the desired strip tension the nearer of the contact members 67 and 68 are in engagement. A dashpot 69 may be connected to the lever 62.

In order to provide for maintaining a predetermined value of tension in the strip 18 under normal operating conditions, and for maintaining a reduced value of tension under stalled conditions, a transfer valve 70 may be utilized for connecting the fluid pressure device 64 to a source of fluid pressure represented by the conduit 71 through either a relatively high-pressure regulating device 72 or a relatively low-pressure regulating device 73. The transfer valve 70 may be provided with an operating winding 74 which may be connected to the control bus conductors 32 through the limit switch 34 to operate the valve to connect the fluid pressure device 64 through the low-pressure regulating device 73 whenever the rheostat 33 is returned to the zero or "off" position to stop the mill.

In order to prevent the regulating generator 47 from attempting to speed up the reel motor 12 to maintain the predetermined value of tension in response to operation of the tension device 52 to its maximum deflection position whenever the strip breaks, or whenever the tension of the strip is substantially zero, as for example, during a threading operation, control means, such as the relay 76 may be provided. The relay 76 may have an operating winding 78 which may be connected to the control conductors 32 through a limit switch 80 which is actuated to the closed position when the bell crank arm 62 moves to the maximum deflection position.

The relay 76 may be arranged to shunt the self-energizing field winding 50 of the regulating generator 47 and to transfer the control winding 49 thereof from the bridge circuit 54 and connect it to the constant voltage control conductors 32 through a rheostat 82, which may be used to adjust the free running speed of the reel motor to a value, such as may be used for a threading operation, and which will be only slightly higher than the normal running speed. The regulating generator 47 is thereby changed to a generator of the normal separately excited type.

For the purpose of minimizing the amount of correction which will be necessary for the booster generator 40 to provide during a winding operation, control means, designated, generally, by the numeral 84, may be provided for progressively increasing the energization of the field winding 14 of the reel motor as the diameter of the coil on the reel 16 increases during the winding operation.

The field winding 14 may be, for example, connected across the control conductors 32 in series circuit relation with a rheostat 86 having an operating motor 87 comprising an armature 88 and a field winding 89. The field winding 89 may be connected to the control conductors 32.

A control generator 90, having an armature 91, a regulating field winding 92 and an auxiliary field winding 93, may be provided for normally effecting the energization of the armature 88. The auxiliary field winding 93 may be connected across the armature 91 to provide a portion of the ampere turns required for operating the rheostat, but not sufficient ampere turns to operate it when the field winding 92 is deenergized. The regulating field winding 92 may be connected across the armature 48 of the regulating generator 47 so as to be energized therefrom whenever the regulating generator operates to correct the tension in the strip 18, as will continue to occur during a winding operation as the diameter of the coil increases.

Control means comprising push button switches 95 and 96 may be provided for controlling the running and reset relays 97 and 98 which may be arranged to connect the armature 88 of the rheostat motor, either to the control generator 90 or to the control conductors 32. A rectifier 99 may be connected in circuit relation with the control generator 90 to prevent reverse operation of the rheostat motor 87, should the voltage of the regulating generator 47 be reversed at the start of a winding operation. Limit switches 100 and 101 prevent overtravel of the rheostat 86.

During operation, the tension means 52 maintains a substantially constant tension in the strip 18 over a relatively wide range of deflections from a normal operating position. As the roll 61 moves from the normal position, the arm 65 operates to vary the resistance of the variable resistors 58 and 59 in opposite senses, depending on whether the strip 18 is deflected above or below the predetermined normal position. Accordingly, the energization of the control winding 49 of the regulating generator 47 will be so varied that the booster generator 40 either increases or decreases the voltage applied to the armature 13 of the reel motor in order to restore the strip 18 and the tension device 52 to the normal operating position.

As the diameter of the coil increases, the reel motor slows down, its armature current increases, and the tension in the strip increases, or tends to increase, so that the deflection of the strip is reduced to below the normal value. Any movement of the strip 18 actuates the tension roll 61 downwardly from the normal position, so as to progressively shunt a greater number of sections of the resistor 58, and a lesser number of the sections of the resistor 59.

Accordingly, the bridge circuit becomes unbalanced and a voltage appears across the control field winding 49 of the regulating generator 47. This voltage has a polarity such that the regulating generator 47 is caused to produce a voltage for energizing the regulating field winding 43 of the booster generator 40 in such a direction as to reduce the voltage applied to the armature 13 of the reel motor. This reduces the armature current of the reel motor and the torque developed by the motor. Accordingly, the deflection of the strip 18 is increased, restoring the tension roll 61 toward its previous or normal operating position.

When a voltage appears across the armature 48 of the regulating generator 47 in response to operation of the tension device 52, the field winding 92 of the control generator 90 is energized thereby, and the rheostat motor 87 is operated to increase the energization of the field winding 14, so that the reel motor may operate at the reduced speed and still provide the increased torque necessary to maintain the predetermined deflection in the strip 18 without requiring an increase in the value of the reel motor armature current. This increase in field energization increases the counter electromotive force of the armature, and increases the deflection of the strip to the predetermined value, so that the tension device 52 operates to reduce the energization of the control field winding to zero, whereupon the rheostat motor 87 stops. The rheostat motor continues this intermittent operation and follows the reel build-up until the limit switch 100 opens at the end of the operating range.

Should the strip break or should the deflection of the tension roll 61 be increased beyond a predetermined maximum value for any reason, the limit switch 80 would be actuated. The operating winding 78 of the relay 76 will thereupon be energized, and the relay 76 operated to shunt the self-energizing field winding 50 of the regulating generator through contact member 76c. At the same time, the control field winding 49 of the regulating generator is disconnected from the bridge circuit 54 by the opening of contact member 76b, and is connected in circuit relation with the control conductors 32 through the threading speed adjusting rheostat 82 by contact member 76a.

Accordingly, the regulating generator 47 is changed from a regulating generator of the self-energizing type, to an ordinary control generator of the separately-excited type. The generator 47 is thereby prevented from building up its voltage in an attempt to speed up the reel motor 12 to restore the predetermined value of strip deflection. Instead, the generator 47 merely generates sufficient voltage, as determined by the operating position of the rheostat 82, so as to operate the reel motor at substantially threading speed which may be slightly in excess of the normal running speed. The field winding 92 of the control generator 90 is disconnected from the regulating generator 47 by the opening of contact member 76d so as to prevent false operation of the field rheostat 86 when the diameter of the coil is not building up.

When the mill is brought to a stalled condition by returning the rheostat 33 to its "off" position to reduce the voltage of the main generator 28, the strip tension may be maintained at a relatively low value since the switch 34 operates and energizes the operating winding 74 of the transfer valve 70. The transfer valve thereupon operates to connect the fluid pressure device 64 to the source of fluid pressure through the relatively low-pressure regulator 73 instead of through the relatively high-pressure regulator 72. The tension device 52 thereupon produces a lower value of tension.

Referring to Fig. 2, the reference numeral 102 may denote, generally, a reel control system, wherein the reel motor 12 having a driving connection with the reel 16 for winding a strip material 18, may be connected to the main bus conductors 26 and 27 of the mill in series circuit relation with the booster generator 40 as described in connection with the control system shown in Fig. 1. In this instance, however, the regulating generator 104 for energizing the field winding 43 of the booster generator 40 is provided with a plurality of control field windings 105, 106 and 107, instead of a single control field winding as in the system of Fig. 1.

The field winding 105 may be energized from a pair of pilot generators 110 and 111 which may be operatively connected to the mill motor 22 and the reel motor 12, respectively. These pilot generators may be connected in a series loop circuit with the control field winding 105 and a rectifier 112. The rectifier functions to permit current to flow only when the voltage of the pilot generator 111 associated with the reel motor is higher than that of the other pilot generator 110. The field windings 106 and 107 of the regulating generator may be connected in opposition in circuit relation with the control conductors 32 and the variable resistance means 58 and 59, respectively, of the tension regulating means 52. Accordingly, they will neutralize each other when the arm 65 of the tension device 52 is in the middle or preferred position.

A field rheostat 114 may be provided in circuit with the field winding 115 of the reel motor pilot generator 111 for adjusting the ampere turns of the control field winding 105 so as to completely neutralize the effect of the control field windings 106 and 107 when the tension is at a minimum value and the reel motor threading speed is slightly higher than the corresponding reel winding speed.

Under these conditions, the regulating generator 104 will function as a speed regulator when the tension roll is in the maximum deflection position during threading operations and will maintain the reel motor at substantially the threading speed. As soon as the reel is threaded, the reel motor speed will be reduced and the voltage of the pilot generator 111 is reduced. The rectifier 112 blocks reverse current flow, so that the current in the speed regulating field winding 105 will be reduced to zero. Since the tension device 52 is now operative to vary the energization of the control field windings 106 and 107 in opposite senses in response to variations in the tension roll position, these field windings are thereupon controlling in determining the output of the regulating generator. As a result, the regulating generator 104 is automatically transformed into a tension regulator throughout the winding operation. The limit switch and control relay used for the transfer, under these conditions, in the system shown in Fig. 1 may therefore be omitted while retaining all the operating benefits thereof. The system operates otherwise in the same manner as the system of Fig. 1.

From the above description and the accompanying drawings, it will be apparent that we have provided, in a simple and effective manner, for controlling the operation of a reel motor by using a regulating generator responsive to the operating position of a tension device. Apparatus embodying our invention is simple and inexpensive to manufacture and is reliable and effective in operation. While the invention has been described as applied to a winding reel, it is apparent that it may be readily adapted to an unwinding reel merely by reversing the connections to the armature 88 of the reel motor field rheostat motor 87 and reversing the connections of the reel motor armature 13 and its associated booster generator armature 41 to the main mill bus conductors 26 and 27.

Since certain changes may be made in the above-described construction, and different embodiments of the invention may be made without departing from the spirit and scope thereof, it is intended that all the matter contained in the above description and shown in the accompanying drawings shall be considered as illustrative, and not in a limiting sense.

We claim as our invention:

1. In a control system for a reel motor having an armature and a field winding, circuit means connected to effect variable energization of the reel motor armature, control means responsive to the tension of a strip of material wound on the reel, regulating means controlled by the control means operable to vary the voltage applied to the reel motor armature from the circuit means, and additional circuit means responsive to the diameter of the coil on the reel connected to control energization of the reel motor field winding.

2. In a control system for a motor having a field winding and an armature connected in driving relation with a reel for strip material, circuit means controlling the energization of the armature including a regulating generator of the self-energizing type, a tension device actuable to different operating positions by the strip material and operable to vary the output of the regulating generator, and control means operable to effect variable energization of the motor field winding in accordance with the diameter of the coil on the reel.

3. A control system for a reel motor having a field winding and an armature having a driving connection with a reel for a strip material comprising, circuit means including a booster generator connected in circuit relation with the armature to apply a variable voltage thereto, a regulating generator connected to control the output voltage of the booster generator, control means including a device responsive to the deflection of the strip from a normal position operable to vary the output of the regulating generator to maintain the strip in a predetermined operating position, and means including a rheostat energized in accordance with the output voltage of the regulating generator connected to effect energization of the motor field winding.

4. A control system for a dynamo-electric machine having a field winding and an armature connected in driving relation with the reel for handling strip material, circuit means connected to effect energization of the armature including a regulating generator having a self-energizing field winding and a control field winding, control means including means responsive to the position of the strip normally operable to effect energization of the control field winding to maintain the strip in a predetermined operating position, relay means operable in response to predetermined operation of the tension means to render the self-energizing field winding ineffective and to render the tension means ineffective to energize the control field winding.

5. In a control system for a reel motor, a tension device responsive to the deflection from a predetermined position of a strip material wound on the reel, a regulating generator normally having predetermined operating characteristics operable in response to operation of the tension device to control the reel motor to maintain the strip in said predetermined position, and control means operable in response to operation of the tension device when the deflection of the strip from said position exceeds a predetermined amount to change the operating characteristics of the regulating generator.

6. A control system for a dynamo-electric machine having a driving connection with a reel for handling strip material comprising, a regulating generator having control field windings connected to effect energization of the dynamo-electric machine, circuit means including a tension device normally operable in response to the operating position of the strip to control the output voltage of the regulating generator to maintain the strip in a predetermined operating position, additional circuit means independent of the operating position of the strip, and control means responsive to deflection of the strip tension in excess of a predetermined maximum value operable to transfer control of the output voltage to the additional circuit means.

7. A control system for a reel motor having a driving connection with a reel arranged to handle strip material in connection with rolling means controlled by a master switch comprising, a regulating generator connected to effect energization of the reel motor, tension means normally operable to different operating positions to control the regulating generator and maintain a predetermined tension in the strip, and control means operable in response to operation of the master switch to stop the rolling means to vary the control of the tension means to maintain a lower tension.

8. A control system for a motor having a driving connection with a reel for strip material comprising, circuit means including a booster generator connected for supplying electrical energy to the reel motor, a regulating generator for controlling the booster generator, said regulating generator having a self-energizing field winding and a control field winding, control means normally connecting the control field winding for energization in accordance with the departure of the strip from a predetermined operating position, and relay means operable in response to predetermined departure of the strip from a predetermined operating position to render the self-energizing field winding ineffective and to transfer the control field winding to a source of substantially constant voltage.

9. In a control system for a reel motor having a driving connection with a reel handling strip material, circuit means controlling the reel motor including a regulating generator having a control field winding and a self-energizing series-type field winding normally effective to supply the air gap magnetomotive losses of the generator, a tension device responsive to the deflection of the strip from a predetermined operating position, circuit means normally connecting the control field winding in a bridge circuit including control means responsive to the tension device to vary the balance of the bridge circuit, and switch means operable in response to operation of the tension device when the operating position of the strip departs more than a predetermined amount from the predetermined position to shunt the self-energizing field winding and transfer the control winding from the bridge circuit to a substantially constant voltage control circuit.

10. The combination with a mill motor having an armature connected in driving relation with a roll stand and energized from a power bus and a field winding energized from a control bus through a field rheostat, of a reel motor having a field winding and an armature connected in driving relation with a reel for strip material passing through the roll stand, a booster generator having an armature connected in circuit relation with the motor armature and the power bus, said booster generator having main and regulating field windings, circuit means including a rheostat operatively connected to the mill motor rheostat connecting the main field winding to the control bus, a regulating generator having an armature and a self-energizing field winding connected in circuit relation with the regulating field winding, said regulating generator being provided with a control field winding, a bridge circuit having variable impedance means in adjacent legs thereof, circuit means connecting the control field winding in said bridge circuit, a tension device operable in response to variation of the strip material from a predetermined operating position to vary the impedances of the variable impedance means in opposite senses to control the reel motor to maintain the strip in said predetermined position, and switch means responsive to the operation of the tension device when the variation of the strip from the predetermined position reaches a predetermined maximum amount in one direction, said switch means being operable to shunt the self-energizing field winding of the regulating generator and transfer the connection of the control field winding thereof from the bridge circuit to the control bus.

11. In a control system for a reel motor having a field winding and an armature connected in driving relation with a reel handling strip material, control means including a regulating generator responsive to the operating position of the strip material connected to energize the armature of the reel motor, a motor-operated rheostat connected to effect variable energization of the field winding of the reel motor, and a control generator responsive to the output of the regulating generator connected to energize the rheostat motor to vary the energization of the motor field winding in accordance with the diameter of a coil on the reel.

12. In a control system for a reel motor having a field winding and an armature connected in driving relation with a winding reel for strip material, control means including a regulating generator responsive to the operating position of the strip connected to control the operation of the reel motor to maintain a predetermined strip position, circuit means including a motor-operated field rheostat connecting the field winding of the reel motor to a source of electrical energy, said rheostat motor having a field winding energized from a source of control voltage and an armature, a control generator having a self-excited field winding and a field winding energized from the regulating generator, and switch means selectively connecting the armature of the rheostat motor to the control generator during a winding operation and to the source of control voltage for resetting at the end of an operation.

13. In a control system for a reel motor having a field winding and an armature having a driving connection with a reel for strip material passing between the rolls of a mill stand, circuit means including a regulating generator connected to vary the energization of the reel motor armature, circuit means connected to control energization of the motor field winding in accordance with the output voltage of the regulating generator, control means responsive to a difference in speed between the mill stand and the reel motor normally operable to control the output of the regulating generator, and tension means responsive to the operating position of the strip material for modifying the output of the regulating generator.

14. A control system for a winding reel used in conjunction with a mill stand comprising, a reel motor having an armature and a field winding, said armature having a driving connection with the reel, circuit means including a booster generator connected in circuit relation with the armature to effect variable energization thereof, a regulating generator connected to control the voltage of the booster generator and having a plurality of field windings, control means connected to effect energization of the motor field winding in accordance with the output of the regulating generator, circuit means connecting one of said field windings for energization in accordance with a differential between voltages proportional to the speeds of the reel motor and the mill stand, and circuit means including a tension device responsive to the operating position of the strip connected to effect energization of a pair of said windings in opposite senses and to selectively vary the energization thereof in opposite senses, the energization of said pair of windings being balanced at a minimum value for the desired operating position.

ERLING FRISCH.
WILLIAM O. OSBON.

REFERENCES CITED

The following references are of record in the file of this patent:

UNITED STATES PATENTS

| Number | Name | Date |
| --- | --- | --- |
| 2,306,157 | Edwards et al. | Dec. 22, 1942 |